Aug. 4, 1959 R. NEIDHARDT 2,897,943
CARRIAGE RETURN CONTROL ARRANGEMENT
Filed Sept. 21, 1955 6 Sheets-Sheet 1

FIG.1

INVENTOR:
Rudolf Neidhardt
By:
Michael S. Striker
agt.

Aug. 4, 1959            R. NEIDHARDT            2,897,943

CARRIAGE RETURN CONTROL ARRANGEMENT

Filed Sept. 21, 1955            6 Sheets-Sheet 2

INVENTOR:
Rudolf Neidhardt
By:
Michael S. Striker
agt.

Aug. 4, 1959 R. NEIDHARDT 2,897,943
CARRIAGE RETURN CONTROL ARRANGEMENT
Filed Sept. 21, 1955 6 Sheets-Sheet 5

INVENTOR:
Rudolf Neidhardt
By:
Michael S. Striker

Aug. 4, 1959 R. NEIDHARDT 2,897,943
CARRIAGE RETURN CONTROL ARRANGEMENT
Filed Sept. 21, 1955 6 Sheets-Sheet 6

FIG.11

INVENTOR:
Rudolf Neidhardt
By:
Michael S. Striker
agt.

United States Patent Office 2,897,943
Patented Aug. 4, 1959

2,897,943

CARRIAGE RETURN CONTROL ARRANGEMENT

Rudolf Neidhardt, Nurnberg, Germany, assignor to Triumph Werke Nurnberg Aktiengesellschaft, Nurnberg, Germany Application September 21, 1955, Serial No. 535,580

Claims priority, application Germany September 22, 1954

25 Claims. (Cl. 197—66)

The present invention relates to carriage control arrangements for business machines, and more particularly to a carriage control arrangement for electrically operated business machines in which the drive means of the carriage are switched off during the return movement of the carriage.

It is known to control the return movement of a carriage of an electrically driven business machine depending on the motion of the carriage. In a known arrangement, the drive means which return the carriage are switched off by two actuating members of which one is operative in the end position of the carriage, and the other is operative in a preliminary position of the carriage.

The known arrangement has the disadvantage that the return movement of the carriage can only be terminated at a point adjusted by the margin stop, whereas an automatic return movement of the carriage is not possible when the carriage is to be moved beyond the normal beginning of the lines determined by the marginal stop. Another disadvantage of the known art is that an adjustment of the margin stop effects a shifting of the beginning of the lines. Furthermore, the distance through which the carriage moves after the drive means are switched off by the preliminary actuating member, is smaller than the distance through which the carriage can move by its own inertia after the drive means have been switched off. Such distance, however, is advantageously used for tabulating operations.

It is one object of the present invention to overcome the disadvantages of the known art, and to provide a carriage return control arrangement for a business machine in which the drive means can be switched off while the carriage is spaced such distance from its end position that the carriage is just capable to move to its end position due to its own inertia.

It is another object of the present invention to carry out such preliminary switching off of the drive means by an actuating member whose position can be adjusted.

It is a further object of the present invention to provide three actuating means for consecutively switching off the drive means which return the carriage.

It is a still further object of the present invention to switch off the drive means in a preliminary position of the carriage, to switch off the drive means in a consecutive position of the carriage corresponding to a normal line beginning, and to switch off the drive means in a terminal position of the carriage corresponding to lines beginning before the normal lines.

With these objects in view, the present invention mainly consists in a carriage return control arrangement for a business machine which includes a movable carriage, and comprises, in combination, drive means for returning the carriage in a return direction, a control mechanism for controlling the drive means during the return movement of the carriage in the return direction, and a plurality of actuating means for actuating the control mechanism during return movement of the carriage in a plurality of carriage positions.

Preferably, first, second and third actuating means are provided for consecutively actuating the control mechanism to switch off the drive means. The first actuating means actuates the control mechanism in a preliminary position of the carriage, the second actuating means actuates the control means when the carriage is in a position corresponding to the beginning of a normal printed line, and the third actuating means actuates a control mechanism in the end position of the carriage which corresponds to the beginning of a line which starts before a normal printed line. The third actuating member is a terminal stop, and may be constituted by a carriage wall.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 11:
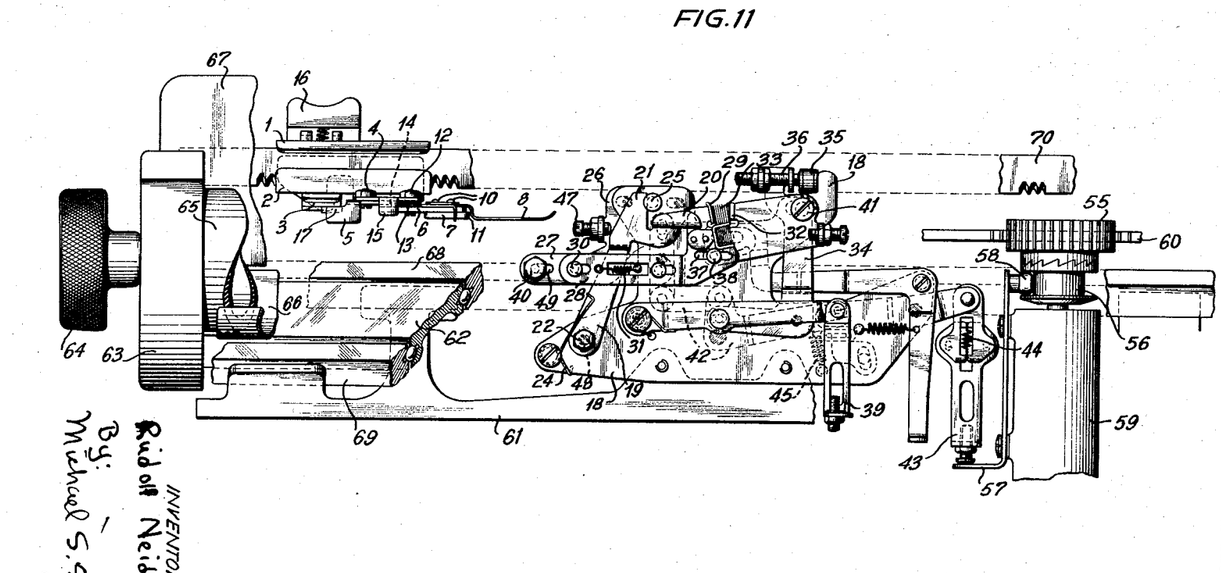
Fig. 11 is a fragmentary front view, partly in section, of the embodiment of Fig. 1 illustrating the drive means.

Referring now to the drawings, and more particularly to Fig. 11, a gear 55 rolls on a transporting rack bar 60, and is connected to a coupling means 56 which is driven by drive means 59. A roller 58 engages the coupling means 56 and is mounted on a coupling rod 57 so that operation of coupling rod 57 will move the coupling means 56 to a disengaged position in which the gear 55 is not driven by the drive means 59.

The rack bar 60 is connected to the movable carriage 62 which includes a lateral part 63, a knob 64, and a platen 65. Paper guide means 66 and 67 are provided on the carriage which is guided between two stationary rails 68 and 69 supported on a stationary frame 61. A toothed bar 70 is secured to the carriage and moves with the same. The stationary frame 61 carries a support 18 as best seen in Fig. 10.

Figures 2, 4:
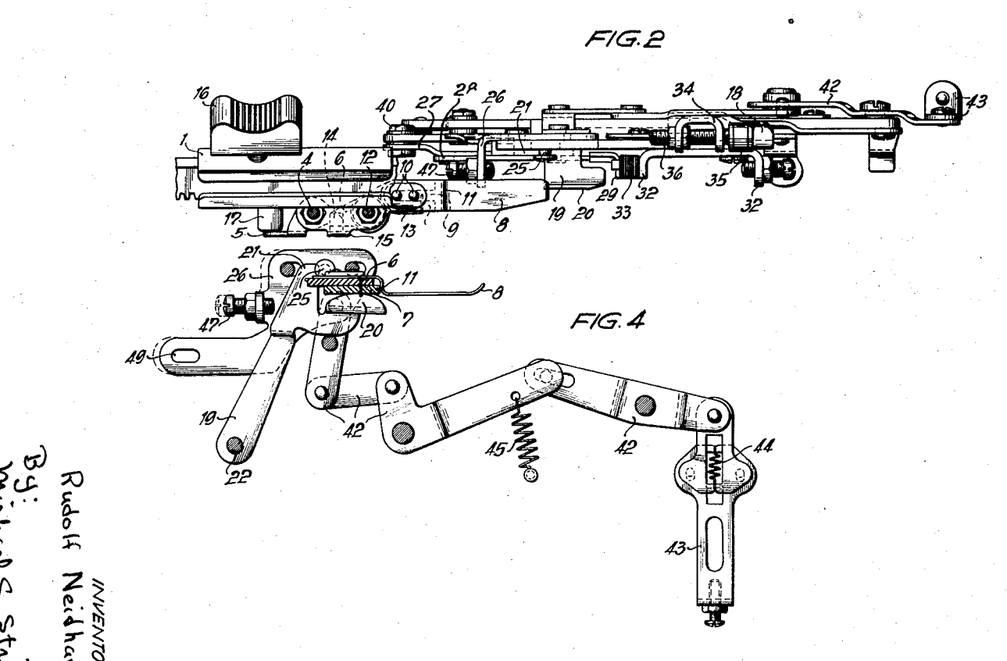
Fig. 2 is a plan view of the embodiment illustrated in Fig. 1.
Fig. 4 is a schematic fragmentary front view of a detail of the embodiment shown in Fig. 1 illustrating a first operational position.

A control mechanism 26, 25, 42, 45, 44 and 43 is mounted on the support 18, and includes a control member 43 which engages the coupling rod 57. The control mechanism also includes an operating member 26 in the form of a plate having a transverse projection on which an adjusting screw 47 is mounted. The operating member 26 has two slots and is held on the support 18 by pins which are secured at one end thereof to the support 18 and pass through the slots in operating member 26, as best seen in Fig. 10. Consequently, the operating member 26 is slidable in the direction of the carriage movement between two positions. Another pin 25 is fixedly secured to the operating member 26 and projects through a cutout in the support 18, as best seen in Figs. 2 and 10.

Figure 1:
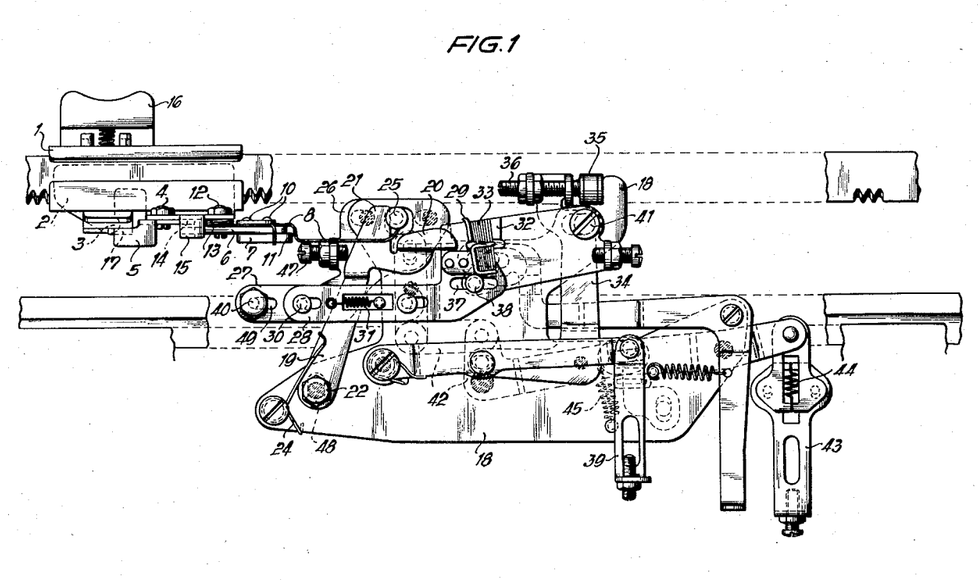
Fig. 1 is a fragmentary front view of a preferred embodiment of the present invention illustrated in a position of rest.
Figure 10:
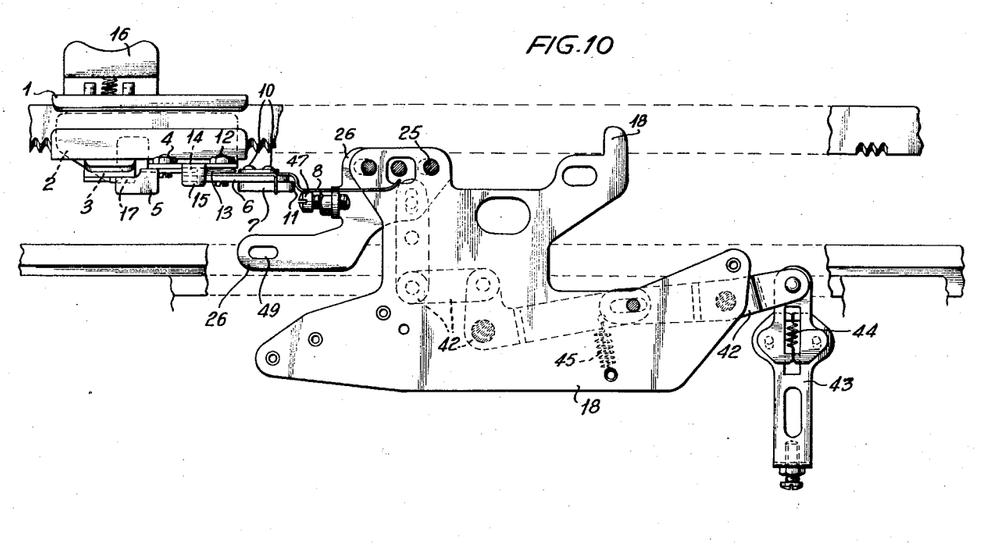
Fig. 10 is a fragmentary front view illustrating a detail of the embodiment shown in Fig. 1 omitting for the sake of clarity a number of elements.

A lever system 42 connects the operating member 26 to the control member 43 and includes spring means 45 which hold the control mechanism in a normal position in which the operating member 26 is in an inoperative position shown in Figs. 1 and 10. The control member 43 includes two parts connected by a spring 44 so that control member 43 is resilient. When the operating member 26 is shifted from the inoperative position shown in Fig. 10 to its operative position shown in Figs. 4 and 5, the lever system 42 of the control mechanism is also shifted, and the control member 43 moves to an advanced position in which the coupling rod 57 is shifted so that the roller 58 disengages the coupling means 56 shown in Fig. 11 and disconnects the drive means 59 from the gear 55 so that the carriage is no longer driven. Consequently, the shifted position of the operating member 26, shown in Figs. 4 and 5, in which the operating member is shifted to the right out of the inoperative position shown in Fig. 10, will be referred to hereinafter as switch-off positon.

Figures 3, 7, 8, 9:
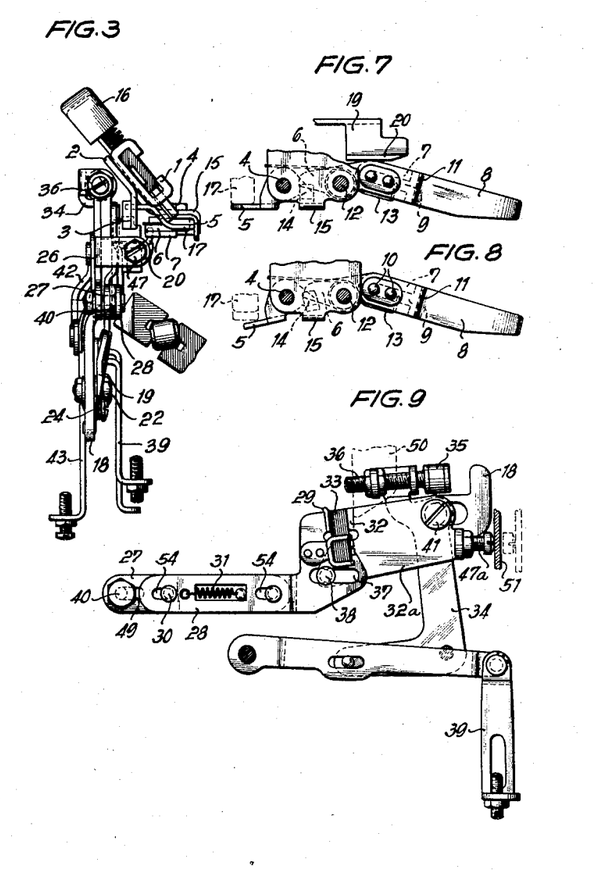
Fig. 3 is a side view of the embodiment illustrated in Fig. 1.
Fig. 7 is a fragmentary plan view showing a detail of the embodiment illustrated in Fig. 2 in another operational position.
Fig. 8 is a fragmentary plan view showing a detail of the embodiment illustrated in Fig. 2 in a further operational position.
Fig. 9 is a fragmentary front view showing a detail of Fig. 1 in another operational position.

A control lever 19 is also part of the control mechanism. One end of lever 19 is formed with a slot 48, see Figs. 1 and 11, through which a bolt 22 passes. Nut means and washers are provided on bolt 22 so that lever 19 is pivotally mounted on the support 18, while the fulcrum of the pivotal movement can be adjusted. A spring 24 engages at the ends thereof the support 18 and the lever 19 and urges the same to turn in clockwise direction in Figs. 1 and 11. The lever 19 has a portion 21 engaging the previously described pin 25 of the operating member 26. Another portion of the lever 19 is formed as a cam 20 which is bent out of the plane of lever 19 as best seen in Fig. 3. Cam 20 has a narrow top cam face the shape of which is best seen in Figs. 1 and 4, and a lateral cam face the shape of which is best seen in Fig. 7. It will be understood that engagement of the top cam face will result in pivotal movement of control lever 19 whereas engagement of the lateral cam face will not produce such movement.

The operating member 26 of the control mechanism is shifted to its switch-off position when the lever 19 pivots in clockwise direction, since the projection portion 21 of lever 19 engages the pin 25 which is fixed on the operating member 26.

The operating member 26 has a narrow lateral projection formed with a slot 49 as best seen in Figs. 4 and 10. Lever means are mounted on the lateral projection of operating member 26, and include a carrier member 27, and a lever 28 connected to the carrier member 27 by bolts 30 which pass through slots 54 in lever 28. The slots 54 permit relative movement between lever 28 and carrier member 27, and the spring 31 connects members 27 and 28 and urges lever 28 into the position shown in Fig. 5 in which the bolts 30 are located at the left ends of slots 54. In the position shown in Fig. 9, the lever 28 is shifted to the left against the action of spring 31, and the bolts 30 are located at the right ends of slots 54.

Carrier member 27 and lever 28 constitute lever means which are supported for pivotal movement on the operating member 26 by pivot means 40 which pass through the slot 49 in operating member 26 so that the fulcrum of the lever means 27, 28 can be adjusted in direction of the carriage movement.

Lever 28 has an abutment 29 and is provided with a spring means 33 which is secured to lever 28 in such manner that a portion of spring 33 is located on the abutment 29. This portion of spring 33 cooperates with another abutment 32 which is a portion of another lever 32a. An air gap of about 1.5 mm. is provided between spring 33 and abutment 32 and is taken up by the spread spring 33. One end of lever 32a is guided along a slot 37 in lever 28 by means of a pin 38 which constitutes a pivotal connection between levers 28 and 32a. The other end of lever 32a is connected by a pivot means 41 to a lever 34, as shown in Fig. 9. A damping means including a rubber member 35 and adjusting screw means 36 is mounted on lever 34 and cooperates with an abutment on support 18. Pin 41 moves in a slot of support 18 so that the damping means 35, 36 is guided for movement in the direction of the carriage movement. The screw means 36 permits an exact adjustment of the moment of engagement between the rubber member 35 and abutment of support 18.

Figure 5:
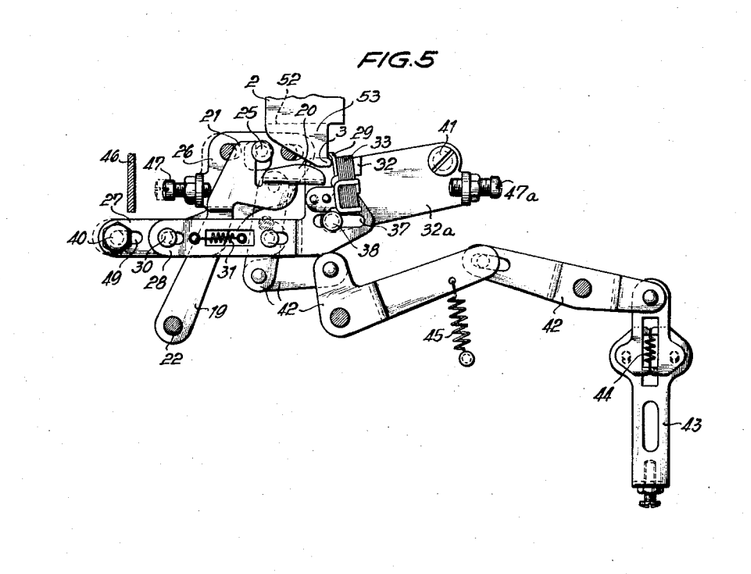
Fig. 5 is a schematic fragmentary front view of a detail of the embodiment shown in Fig. 1 illustrating a second operational position.

Lever 34 is part of a lever system which includes a release member 39. When the release member 39 is operated, the release lever 34 pivots the lever means 27, 28 and the lever 32a about the fulcrums 40 and 41, respectively, so that abutments 29 and 32 are lowered for releasing the carriage stops. The release member 39 operates a blocking means, not shown, which blocks all keys of the machine in an end position of the carriage. The right hand margin stop 50 is shown in broken lines in Fig. 9 and moves with the carriage. Stop 50 engages abutment 32 and shifts levers 34, 39 to block the keys. When release member 39 pivots lever 32a, the keys are released, and the carriage moves freely until wall 51 engages adjusting screw 47a. The adjusting screw 47a is mounted at the right end of lever 32a as best seen in Figs. 5 and 9, and is engaged by the lateral wall 51 at the right end of the carriage when the carriage is in its extreme left position. Consequently, the carriage walls 46 and 51 are terminal stops defining the extreme end positions of the carriage, and such end positions can be exactly adjusted by screws 47 and 47a.

According to the present invention, a plurality of actuating means is provided for actuating the control mechanism to disconnect the drive means. A first actuating means actuates the control mechanism in a preliminary carriage position by engaging the cam 20 and pivoting the lever 19 to shift operating member 26 to its switch-off position. A second actuating means operates the control mechanism by engaging the abutment 29 and shifting the lever means 27, 28 together with the operating member 26 which moves to its switch-off position whereby the drive means are disconnected in a carriage position corresponding to the beginning of normal lines. A third actuating means is constituted by the carriage wall 46 and operates the control mechanism by engaging the adjusting screw 47 and shifting the operating member 26 to its switch-off position whereby the drive means are disconnected in the extreme right carriage position, in which lines can be printed beginning before a normal printed line.

The actuating means will now be described in greater detail. At the left of the carriage a margin stop means 1 is mounted on the toothed bar 70, and is adjustable along the length of bar 70. A plate 2 is fixed on the margin stop means 1 and is provided with an actuating portion 53 having an actuating projection 3 which constitutes an actuating member and cooperates with the abutment 29 as shown in Fig. 2. A substantially vertical pin 4 is mounted on the plate 2 and pivotally supports an intermediate lever 5 which engages by a bridge-shaped portion 14 the end of a carrier lever 6 which is pivotally mounted on plate 2 by pivot means 12. An actuating member 7 is mounted on the carrier lever 6. The carrier lever 6 has a fork-shaped end portion defining a slot 9 which extends in the direction of the carriage movement. Two screws 10 pass through slot 9 and connect the actuating member 7 to the carrier lever 6 so that the position of the actuating member 7 is adjustable.

The actuating member 7 has an end portion 11 which cooperates with the cam 20, as will be described hereinafter in greater detail, and consequently an adjustment of the actuating member 7 relative to the carrier lever 6 and to actuating member 3 can be carried out. A leaf spring 8 is secured to the actuating member 7, and a spring 13 urges the carrier lever 6, the first actuating member 7 and the leaf spring 8 into a position shown in Fig. 2 in which the leaf spring 8, the first actuating member 7, the carrier lever 6, and the intermediate lever 5 are substantially aligned and extend in the direction of the carriage movement. In this position, the end portion 11 of the actuating member 7 is located in the plane of the top cam face of the cam 20.

The margin stop means 1 is provided with a grip member 16 which is connected to a plate 17 slidably mounted on the margin stop means 1. A spring urges the grip member 16 and the plate 17 to a retracted position in which the end of plate 17 just engages the end of the intermediate lever 5 as shown in Fig. 7. When the grip member 16 is manually operated, the plate 17 is advanced and pivots the lever 5 into the position shown in Fig. 8 so that the bridge-shaped portion 14 turns carrier lever 6 and the actuating member 7 together with the leaf sping 8. When the actuating member 7 is turned into this position, the end portion 11 is located outside of the plane of the top cam face of cam 20.

The arrangement according to the present invention operates as follows:

When the carriage is returned to the right in Fig. 4 by drive means 55, 56, 59 and reaches the preliminary switch-off position shown in this figure, the first actuating member 7 passes over the top cam face of cam 20 and pivots lever 19 so that the projection 21 shifts the operating member 26 through pin 25 whereby the control mechanism is actuated so that the control member 43 disconnects the coupling means 56.

During further return movement of the carriage due to inertia, the preliminary stop 7 passes beyond cam 20 and the carriage reaches the second switch-off position shown in Fig. 5 in which the second actuating member, that is the main stop projection 3 engages the abutment 29 of the lever 28 from below whereby the abutment 29 is urged against the abutment 32 on lever 32a. Thereby, the lever means 27, 28 are shifted and shift the operating member 26 through pin 40 into its switch-off position in which the lever system 42 and the control member 43 are shifted whereby the drive means are disconnected. This position of the carriage corresponds to the beginning of a "normal" line of typewritten text. By operation of release levers 34, 39, lever 28 is pivoted and abutment 29 releases the main margin stop 3 so that operating member 26 returns to its inoperative position and the drive means are rendered operative.

Figure 6:
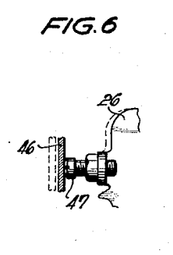
Fig. 6 is a schematic fragmentary front view of a detail of the embodiment shown in Fig. 1 illustrating a third operational position.

Upon a further return movement of the carriage, the carriage reaches the third switch-off position which is the end position shown in Fig. 6 in which the adjustment screw 47 is engaged by a terminal stop, that is the lateral wall 46 of the carriage, see also Fig. 5, whereby the operating member 26 is shifted to its switch-off position and the lever system 42 is actuated so that control member 43 disconnects the drive means. The member 39 is preferably operated at the same time.

As previously described, the stroke of the control member 43 can be adjusted by adjusting the control lever 19 by means of slot 48, or by adjusting the carrier lever 27 by means of its slots 49.

Assuming that the operator starts operating the keys after one of the three switch-off operations, the spring-loaded paper carriage starts moving in writing direction which is opposite to the previously described direction of the carriage return movement. During such motion of the carriage, the left edge of the first actuating member 7 engages the lateral cam face of the cam 20 so that the actuating member 7 together with the leaf spring 8 pivots in clockwise direction into the position shown in Fig. 7. During further movement of the carriage in writing direction, which is to the left in Fig. 7, the leaf spring slides along the lateral cam face of the cam 20 so that the first actuating member 7 is held in its inoperative position until the end of the leaf spring 8 has passed beyond the cam 20. Since the actuating member 7 and leaf spring 8 engage the lateral cam face of cam 20, the lever 19 is not pivoted during the engagement. When the member 7 is spaced sufficiently from the cam 20 due to the action of the leaf spring 8 sliding on the lateral cam face of cam 20, movement of the carriage in return direction results in engagement between the actuating member 7 and the cam 20 so that the lever 19 is operated and the drive means are disconnected whereby the carriage moves due to inertia until the projection 3 engages the abutment 29 and shifts the same into a position in which the abutment 29 is blocked by the abutment 32.

If the operator desires to adjust the left margin before a writing operation, the grip member 16 is depressed and the plate 17 is moved downwardly so that the intermediate lever 5 is pivoted about the pin 4 in counterclockwise direction into the position shown in Fig. 8. Since the bridge-shaped portion 14 of the intermediate lever 5 engages one end of the carrier lever 6, the same is turned together with the actuating member 7 and leaf spring 8 into the previously described inoperative position. The operator can now shift the margin stop means 1 until the projection 3 engages the abutment 29 blocked by abutment 32 whereby the exact beginning of a normal line is determined.

In the switch-off position illustrated in Fig. 9, the lever 28 is shifted to the left against the action of spring 31 with the pins 30 sliding in slots 54, so that the margin stop 50 and the right lateral wall 51 of the carriage do not resist a shifting of the abutment 32 by operation of release lever means 34, 39.

According to a modified embodiment, the portion 53 of the plate 2 shown in Fig. 5 to be located below the line 52 can be omitted. A margin stop means constructed in this manner permits movement of the returning carriage to the end position determined by the terminal stop 46 after the preliminary switch-off produced by actuating member 7. In this arrangement, the carriage moves, due to its inertia after the drive means have been switched off by actuating member 7, and the distance through which the carriage moves can be adjusted accordingly to correspond to the normal distance required for the carriage to come to a standstill upon engagement with terminal stop 46 when moving only due to its momentum. In this embodiment the stop 46 is the main stop and defines the beginning of a "normal" typewritten line.

This construction is particularly advantageous for bookkeeping machines, since the columns of the printed sheet are provided with different inscriptions. The entire distance covered by the carriage due to its momentum can be used for tabulating operations, while the desired beginning of the lines can be selected by operating corresponding tabulating keys. Thereby a desired beginning can be selected for each printed line.

It will be understood that the operator is capable of selecting in a known manner by operating of a tabulator key the place at which the carriage stops.

The arrangement according to the present invention permits an adaptation of the business machine to all operations required during printing and bookkeeping, particularly by the selection of the switch-off positions determined by the first and second actuating means.

The return movement of the carriage can extend beyond the ends of normal printed lines determined by the margin stops 1 and 50. When the carriage has moved beyond the left margin stop 1, it can move due to the action of known spring means in opposite writing direction to the normal beginning of the lines, or to any other selected beginning of printed lines.

A particular advantage of the arrangement resides in that the distance through which the carriage moves due to inertia can be exactly adjusted to the momentum of the moving mass of the carriage. It will be understood that a long inertia movement and an unshortened time of inertia movement of the returning carriage can be used for tabulating operations in a highly efficient and economic manner.

It will be understood that each of the elements described above, or two or more together, may also find a useful application in other types of business machines differing from the types described above.

While the invention has been illustrated and described as embodied in a carriage return control arrangement for an electrically driven business machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a business machine including a stationary frame and a carriage movably mounted on said frame, in combination, drive means for returning the carriage in a return direction; a control mechanism for controlling and in activating said drive means and including an operating member mounted on said frame for movement between an inoperative position and a switch-off position, and connected to said drive means for inactivating the same when said operating member is in said switch-off position; a margin stop means adjustably mounted on the carriage and including first and second actuating members for consecutively shifting during return movement of the carriage said operating member from said inoperative to said switch-off position for disconnecting said drive means, said first actuating member shifting said operating member in a preliminary carriage position so that the carriage moves further due to inertia, and said second actuating member shifting said operating member in another carriage position corresponding to the normal beginning of a line and stopping the carriage; and a terminal stop fixed on the carriage for shifting during return movement of the carriage, said operating member to said switch-off position for disconnecting said drive means and stopping the carriage in a position of the carriage corresponding to a line beginning before a normal printed line.

2. An arrangement as claimed in claim 1 and including adjusting means supporting said first actuating member on said margin stop means for adjustment of said first actuating member in the direction of the carriage movement whereby the distance between said preliminary carriage position and said other carriage position can be adjusted.

3. In a business machine including a stationary frame and a carriage movably mounted on said frame, in combination, drive means for returning the carriage in a return direction; a control mechanism for controlling and inactivating said drive means and including a support secured to the stationary frame, an operating member mounted on said frame for movement between an inoperative position and a switch-off position, a control member connected to said operating member for movement therewith and connected to said drive means for inactivating the same when said operating member is in said switch-off position, and an operating lever pivotally mounted on said support and engaging said operating member, said operating lever having a cam portion; a margin stop means mounted on said carriage and including a supporting plate, a carrier lever pivotally mounted on said supporting plate, a first actuating member mounted on said carrier lever adjustable in the direction of the carriage movement, and a leaf spring secured to said first actuating member, said carrier lever, said first actuating member, and said leaf spring being turnable between an operative position and an inoperative position, a spring urging said carrier lever into said operative position, said margin stop means further including a second actuating member, said first actuating member in said operative position engaging said cam portion during return movement of the carriage whereby said operating lever is pivoted and shifts said operating member to said switch-off position to inactivate said drive means in a preliminary carriage position, said first actuating member being engaged by said cam portion during movement of the carriage in an opposite writing direction and shifted to said inoperative position with said leaf spring sliding along said cam portion without shifting said operating lever, said second actuating member consecutively shifting in another position of the carriage corresponding to the beginning of a normal printed line said operating member to said switch-off position of the same; and a terminal stop fixed on the carriage and engaging during return movement of said carriage said operating member and shifting the same to said switch-off position when the carriage is in a position corresponding to a line beginning before a normal printed line.

4. In a business machine including a stationary frame and a carriage movably mounted on said frame, in combination, drive means for returning the carriage in a return direction; a control mechanism for controlling and inactivating said drive means and including a support secured to the stationary frame, an operating member mounted on said frame for movement between an inoperative position and a switch-off position, a control member connected to said operating member for movement therewith and connected to said drive means for inactivating the same when said operating member is in said switch-off position, and an operating lever pivotally mounted on said support and engaging said operating member, said operating lever having a cam portion; a margin stop means adjustably mounted on said carriage and including a supporting plate, an intermediate lever pivotally mounted on said supporting plate, a carrier lever pivotally mounted on said supporting plate and engaging said intermediate lever, a first actuating member mounted on said carrier lever adjustable in the direction of the carriage movement, and a leaf spring secured to said first actuating member, said carrier lever, said first actuating member, and said leaf spring being turnable between an operative position and an inoperative position, a spring urging said carrier lever into said operative position, said margin stop means further including manually operated means for turning said intermediate lever, and a second actuating member, said first actuating member in said operative position engaging said cam portion during return movement of the carriage whereby said operating lever is pivoted and shifts said operating member to said switch-off position to inactivate said drive means in a preliminary carriage position, said first actuating member being engaged by said cam portion during movement of the carriage in an opposite writing direction and shifted to said inoperative position with said leaf spring sliding along said cam portion without shifting said operating lever, said first actuating member, turned by said manually operated means through said intermediate lever into said inoperative position, passing by said cam portion during adjustment of said margin stop means on the carriage, said second actuating member consecutively shifting in another position of the carriage corresponding to the beginning of a normal printed line said operating member to said switch-off position of the same; and a terminal stop fixed on the carriage and engaging during return movement of said carriage said operating member and shifting the same to said switch-off position when the carriage is in a position corresponding to a line beginning before a normal printed line.

5. An arrangement as claimed in claim 4 wherein said intermediate lever, said carrier lever, said first actuating member, and said leaf spring are substantially aligned in said operative position, and wherein said intermediate lever and said carrier lever are turnable about substantially vertical axes.

6. An arrangement as claimed in claim 4 wherein said operating member includes a projecting pin and is mounted on said support for rectilinear movement between said positions thereof, and wherein said operating lever includes a projection engaging said pin, and wherein said control member is resilient, and wherein said control mechanism includes a spring means urging said operating lever into a normal position from which it is displaced by said first and second actuating members.

7. An arrangement as claimed in claim 4 and including a lever means mounted on said operating member for pivotal movement and having an abutment, said abutment being engaged by said second actuating member during return movement of the carriage whereby said operating member is shifted to said switch-off position; another lever pivotally mounted on said support and having another abutment located opposite said first-mentioned abutment; spring means between said abutments; another terminal stop fixed on the carriage for defining the end of a line and engaging said other lever during movement of the carriage; a locking means for locking the keys of the business machine engaged by said other abutment in an end position of the carriage; and releasing lever means pivotally connected to said other lever for pivoting the same and said lever means to a position in which said other abutment releases said locking means.

8. An arrangement as claimed in claim 7 and including damping means mounted on said releasing lever means for movement with the same and with said other lever when said first-mentioned abutment engages said other abutment, said damping means engaging said support during said movement for blocking movement of said other abutment with said other lever.

9. An arrangement as claimed in claim 8 wherein said lever means includes a carrier member adjustably secured to said operating member and a lever mounted on said carrier member for limited movement in direction of the carriage movement, said lever being movable on said carrier member between two positions, spring means urging said lever into one of said positions thereof, said lever being moved to the other of said positions thereof by said other terminal stop.

10. An arrangement as claimed in claim 4 wherein said terminal stop is a lateral wall of the carriage, and wherein said operating member includes an adjustable screw engaged by said lateral wall of the carriage during return movement of the carriage when the carriage moves beyond the beginning of a normal printed line.

11. An arrangement as claimed in claim 4 wherein said operating lever is formed with a slot; and including a pivot pin secured to said support and passing through said slot for pivotally supporting said operating lever whereby the fulcrum of said operating lever can be adjusted for varying the distance through which said control member moves when said operating lever is pivoted.

12. In a business machine including a stationary frame and a carriage movably mounted on said frame, in combination, drive means for returning the carriage in a return direction; a control mechanism for controlling and inactivating said drive means and including a support secured to the stationary frame, an operating member mounted on said frame for movement between an inoperative position and a switch-off position, a control member connected to said operating member for movement therewith and connected to said drive means for inactivating the same when said operating member is in said switch-off position, and an operating lever pivotally mounted on said support and engaging said operating member, said operating lever having a cam portion; a margin stop means mounted on said carriage and including a supporting plate, a carrier lever pivotally mounted on said supporting plate, an actuating member mounted on said carrier lever adjustable in the direction of the carriage movement, and a leaf spring secured to said actuating member, said carrier lever, said actuating member, and said leaf spring being turnable between an operative position and an inoperative position, a spring urging said carrier lever into said operative position, said actuating member in said operative position engaging said cam portion during return movement of the carriage whereby said operating lever is pivoted and shifts said operating member to said switch-off position to inactivate said drive means in a preliminary carriage position, said actuating member being engaged by said cam portion during movement of the carriage in an opposite writing direction and shifted to said inoperative position with said leaf spring sliding along said cam portion without shifting said operating lever; and a terminal stop fixed on the carriage and engaging during return movement of said carriage said operating member and shifting the same to said switch-off position when the carriage is in a position corresponding to a line beginning before a normal printed line.

13. In a business machine including a stationary frame and a carriage movably mounted on said frame, in combination, drive means for returning the carriage in a return direction; a control mechanism for controlling and inactivating said drive means and including a support secured to the stationary frame, an operating member mounted on said frame for movement between an inoperative position and a switch-off position, a control member connected to said operating member for movement therewith and connected to said drive means for inactivating the same when said operating member is in said switch-off position, and an operating lever pivotally mounted on said support and engaging said operating member, said operating lever having a cam portion; a margin stop means mounted on said carriage and including a supporting plate, a carrier lever pivotally mounted on said supporting plate, and a first actuating member mounted on said carrier lever adjustable in the direction of the carriage movement, said carrier lever and said first actuating member being turnable between an operative position and an inoperative position, a spring urging said carrier lever into said operative position, said margin stop means further including a second actuating member, said first actuating member in said operative position engaging said cam portion during return movement of the carriage whereby said operating lever is pivoted and shifts said operating member to said switch-off position to inactivate said drive means in a preliminary carriage position, said first actuating member being engaged by said cam portion during movement of the carriage in an opposite writing direction and shifted to said inoperative position, said second actuating member consecutively shifting in another position of the carriage corresponding to the beginning of a normal printed line said operating member to said switch-off position of the same; and a terminal stop fixed on the carriage and engaging during return movement of said carriage said operating member and shifting the same to said switch-off position when the carriage is in a position corresponding to a line beginning before a normal printed line.

14. In a business machine including a stationary frame and a carriage movably mounted on said frame, in combination, drive means for returning the carriage in a return direction; a control mechanism for controlling and inactivating said drive means and including a support secured to the stationary frame, an operating member mounted on said frame for movement between an inoperative position and a switch-off position, a control member connected to said operating member for movement therewith and connected to said drive means for inactivating the same when said operating member is in said switch-off position, and an operating lever pivotally mounted on said support and engaging said operating member, said operating lever having a cam portion; a margin stop means mounted on said carriage and including a supporting plate, a carrier lever pivotally mounted on said supporting plate, and a first actuating member mounted on said carrier lever adjustable in the direction of the carriage movement, said carrier lever and said first actuating member being turnable between an operative position and an inoperative position, a spring urging said carrier lever into said operative position, said margin stop means further including a second actuating member, said first actuating member in said operative position engaging said cam portion during return movement of the carriage whereby said operating lever is pivoted and shifts said operating member to said switch-off position to inactivate said drive means in a preliminary carriage position, said first actuating member being engaged by said cam portion during movement of the carriage in an opposite writing direction and shifted to said inoperative position, said second actuating member consecutively shifting in another position of the carriage corresponding to the beginning of a normal printed line said operating member to said switch-off position of the same; abutment means blocking movement of said second actuating member after the same has shifted said operating member to said switch-off position whereby the beginning of a normal printed line is determined; adjustable screw means on said operating member; and a terminal stop fixed on the carriage and engaging during return movement of said carriage said adjustable screw means for shifting said operating member to said switch-off position when the carriage is in a position corresponding to a line beginning before a normal printed line, said last-mentioned position being adjustable by adjusting said screw means.

15. An arrangement as claimed in claim 14 wherein said operating member is connected to another abutment means, wherein said second actuating member engages said other abutment means; and including spring means between said two abutment means.

16. In a business machine including a stationary frame and a carriage movably mounted on said frame, in combination, drive means for returning the carriage in a return direction; a control mechanism for controlling and inactivating said drive means and including an operating member mounted on said frame for movement between an inoperative position and a switch-off position and being connected to said drive means for inactivating the same when said operating member is in said switch-off position, and an operating lever pivotally mounted on said frame and engaging said operating member, said operating lever having a cam portion; a margin stop means mounted on said carriage and including a first actuating member turnable between an operative position and an inoperative position and a spring urging said first actuating member into said operative position, said margin stop means further including a second actuating member, said first actuating member in said operative position engaging said cam portion during return movement of said carriage whereby said operating lever is pivoted and shifts said operating member to said switch-off position, said first actuating member being engaged by said cam portion during movement of the carriage in opposite writing direction and shifted to said inoperative position, said second actuating member consecutively shifting in another position of the carriage corresponding to the beginning of a normal printed line said operating member to said switch-off position of the same; and a terminal stop fixed on the carriage and engaging during further return movement of said carriage said operating member for shifting the same to said switch-off position when the carriage is in a position corresponding to a line beginning before a normal printing line.

17. In a typewriting business machine including a stationary frame and a carriage movably mounted on said frame, in combination, means for moving the carriage in a writing direction; an electrtic motor for moving the carriage in a return direction; coupling means between said electric motor and the carriage shiftable between a releasing position and a coupling position; a plurality of control devices for controlling the return movement of the carriage, each of said control devices including a first part mounted on the carriage and a second part mounted on the stationary frame, each of said control devices being connected to said coupling means for moving the same to said releasing position upon engagement between the respective first and second parts thereof during return movement of the carriage, at least one of said control devices having at least one of said parts thereof movable to permit further return movement of the carriage due to inertia after engagement between said parts thereof, and another of said control devices constituting a main margin stop means and stopping carriage movement in return direction when said parts thereof engage each other, the first part of a further control device being a terminal stop mounted at one end of the carriage spaced from said main margin stop means and stopping carriage return movement in extreme end position of the carriage; and release means connected to said other control device for releasing said first and second parts thereof so that the carriage can continue the return movement until stopped by said further control device.

18. In a business machine including a stationary frame and a carriage movably mounted on said frame, in combination, drive means for returning the carriage in a return direction; a control mechanism for controlling and inactivating said drive means and including a first operating member mounted on said frame for movement between an inoperative position and a switch-off position and being connected to said drive means for inactivating the same when said first operating member is in said switch-off position, and a second operating member movably mounted on said frame and engaging said first operating member, said second operating member having a cam portion; a margin stop means mounted on said carriage and including a first actuating member turnable between an operative position and an inoperative position and a means urging said first actuating member into said operative position, said margin stop means further including a second actuating member, said first actuating member in said operative position engaging said cam portion during return movement of said carriage whereby said second operating member is moved and shifts said first operating member to said switch-off position, said first actuating member being engaged by said cam portion during movement of the carriage in opposite writing direction and shifted to said inoperative position, said second actuating member consecutively shifting in another position of the carriage corresponding to the beginning of a normal printed line said first operating member to said switch-off position of the same; and a terminal stop fixed on the carriage and engaging during further return movement of said carriage said first operating member for shifting the same to said switch-off position when the carriage is in a position corresponding to a line beginning before a normal printing line.

19. In a business machine including a stationary frame and a carriage movably mounted on said frame, in combination, drive means for returning the carriage in a return direction; a control mechanism for controlling and inactivating said drive means and including a first operating member mounted on said frame for movement between an inoperative position and a switch-off position and being connected to said drive means for inactivating the same when said first operating member is in said switch-off position, and a second operating member movably mounted on said frame and engaging said first operating member, said second operating member having a cam portion; a margin stop means mounted on said carriage movable in direction of movement of the same and including manually releasable means for securing said margin stop means to said carriage in a plurality of positions, said margin stop means including a first actuating member turnable between an operative position and an inoperative position and a means urging said first actuating member into said operative position, said margin stop means further including a second actuating member, said first actuating member in said operative position engaging said cam portion during return movement of said carriage whereby said second operating member is moved and shifts said first operating member to said switch-off position, said first actuating member being engaged by said cam portion during movement of the carriage in opposite writing direction and shifted to said inoperative position, said second actuating member consecutively shifting in another position of the carriage corresponding to the beginning of a normal printed line said first operating member to said switch-off position of the same, the position of said second actuating member being adjustable by shifting said margin stop means between said positions thereof along said carriage for determining the position of the beginning of a normal printed line; and a terminal stop fixed on the carriage and engaging during further return movement of said carriage said first operating member for shifting the same to said switch-off position when the carriage is in a position corresponding to a line beginning before a normal printing line.

20. A business machine as set forth in claim 19 wherein said manually releasable means include a manually operated member movable between an inoperative position and a position releasing said releasable means of said margin stop means, said manually operated member in said releasing position engaging said first actuating member and shifting the same to said inoperative position.

21. In a typewriting business machine including a stationary frame and a carriage movably mounted on said frame, in combination, means for moving the carriage in a writing direction; drive means for moving said carriage in a return direction, said drive means being shiftable between an inoperative condition and an operative condition and moving in said operative condition said carriage in said return direction; a plurality of control devices for controlling the return movement of the carriage, each of said control devices including a first part mounted on the carriage and a second part mounted on the stationary frame, each of said control devices being connected to said drive means for moving the same to said inoperative position upon engagement between the respective first and second parts thereof during return movement of the carriage, at least one of said control devices having at least one of said parts thereof movable to permit further return movement of the carriage due to inertia after engagement between said parts thereof, and another of said control devices constituting a main margin stop means and stopping carriage movement in return direction when said parts thereof engage each other, the first part of a further control device being a terminal stop mounted at one end of the carriage spaced from said main margin stop means and stopping carriage return movement in extreme end position of the carriage; and release means connected to said other control device for releasing said first and second parts thereof so that the carriage can continue the return movement until stopped by said further control device.

22. In a typewriting business machine including a stationary frame and a carriage movably mounted on said frame, in combination, means for moving the carriage in a writing direction; drive means for moving said carriage in a return direction, said drive means being shiftable between an inoperative condition and an operative condition and moving in said operative condition said carriage in said return direction; a plurality of control devices for controlling the return movement of the carriage, each of said control devices including a first part mounted on the carriage and a second part mounted on the stationary frame, each of said control devices being connected to said drive means for moving the same to said inoperative position upon engagement between the respective first and second parts thereof during return movement of the carriage, at least one of said control devices having at least one of said parts thereof movable to permit further return movement of the carriage due to inertia after engagement between said parts thereof, and another of said control devices constituting a main margin stop means and stopping carriage movement in return direction when said parts thereof engage each other, the first part of a further control device being a terminal stop mounted at one end of the carriage spaced from said main margin stop means and stopping carriage return movement in extreme end position of the carriage, said first part of said other of said control devices being adjustably mounted on said carriage for movement between a plurality of arrested positions, and cooperating in each of said arrested positions with said second part of said other of said control devices for determining the beginning of a normal printed line; manually operated means for shifting said first part of said other of said control devices between said plurality of positions; and release means connected to said other control device for releasing said first and second parts thereof so that the carriage can continue the return movement until stopped by said further control device.

23. A business machine as set forth in claim 22 wherein said manually operated means are movable to a releasing position for releasing said first part of said other of said control devices from said arrested positions, and engage said first part of said one of said control devices to move the same to an inoperative position in which it is spaced from said second part thereof in a direction transverse to the direction of movement of said carriage.

24. In a business machine including a stationary frame and a carriage movably mounted on said frame, in combination, drive means for returning the carriage in a return direction; a control mechanism for controlling and inactivating said drive means and including an operating member mounted on said frame for movement between an inoperative position and a switch-off position and being connected to said drive means for inactivating the same when said operating member is in said switch-off position, and an operating lever pivotally mounted on said frame and engaging said operating member, said operating lever having a cam portion; a margin stop means mounted on said carriage movable in direction of movement of the same and including manually releasable means for securing said margin stop means to said carriage in a plurality of positions, said margin stop means including a first actuating member turnable between an operative position and an inoperative position and a spring urging said first actuating member into said operative position, said margin stop means further including a second actuating member, said first actuating member in said operative position engaging said cam portion during return movement of said carriage whereby said operating lever is pivoted and shifts said operating member to said switch-off position, said first actuating member being engaged by said cam portion during movement of the carriage in opposite writing direction and shifted to said inoperative position, said second actuating member consecutively shifting in another position of the carriage corresponding to the beginning of a normal printed line said operating member to said switch-off position of the same, the position of said second actuating member being adjustable by shifting said margin stop means between said positions thereof along said carriage for determining the position of the beginning of a normal printed line; and a terminal stop fixed on the carriage and engaging during further return movement of said carriage said operating member for shifting the same to said switch-off position when the carriage is in a position corresponding to a line beginning before a normal printing line.

25. In a typewriting business machine including a stationary frame and a carriage movably mounted on said frame, in combination, means for moving the carriage in a writing direction; an electric motor for moving the carriage in a return direction; coupling means between said electric motor and the carriage shiftable between a releasing position and a coupling position; a plurality of control devices for controlling the return movement of the carriage, each of said control devices including a first part mounted on the carriage and a second part mounted on the stationary frame, each of said control devices being connected to said coupling means for moving the same to said releasing position upon engagement between the respective first and second parts thereof during return movement of the carriage, at least one of said control devices having at least one of said parts thereof movable to permit further return movement of the carriage due to inertia after engagement between said parts thereof, and another of said control devices constituting a main margin stop means and stopping carriage movement in return direction when said parts thereof engage each other, the first part of a further control device being a terminal stop mounted at one end of the carriage spaced from said mean margin stop means and stopping carriage return movement in extreme end position of the carriage, said first part of said other of said control devices being adjustably mounted on said carriage for movement between a plurality of arrested positions, and cooperating in each of said arrested positions with said second part of said other of said control devices for determining the beginning of a normal printed line; manually operated means for shifting said first part of said other of said control devices between said plurality of positions; and release means connected to said other control device for releasing said first and second parts thereof so that the carriage can continue the return movement until stopped by said further control device.

References Cited in the file of this patent

UNITED STATES PATENTS

| | | |
|---|---|---|
| 2,283,565 | Michelsen | May 19, 1942 |
| 2,348,048 | Anderson | May 2, 1944 |
| 2,393,441 | Yaeger | Jan. 22, 1946 |
| 2,423,586 | Decker | July 8, 1947 |
| 2,630,900 | Anderson | Mar. 10, 1953 |
| 2,797,789 | Yaeger | July 2, 1957 |